United States Patent [19]
Tsuruta

[11] 3,865,169
[45] Feb. 11, 1975

[54] RADIATION TIRE
[76] Inventor: Yasuo Tsuruta, No. 22-2, 4-chome, Tokyo, Japan
[22] Filed: June 22, 1973
[21] Appl. No.: 372,532

[30] Foreign Application Priority Data
June 24, 1972 Japan.................................. 47-63481

[52] U.S. Cl........... 152/330 C, 152/153, 152/362 R
[51] Int. Cl. ............................................. B60c 19/06
[58] Field of Search 152/152, 153, 330 R, 352–357, 152/374, 362 R, 330 C

[56] References Cited
UNITED STATES PATENTS

| | | | |
|---|---|---|---|
| 1,457,892 | 6/1923 | Blackwelder.................. | 152/330 C |
| 2,475,199 | 7/1949 | Reynolds........................ | 152/330 C |
| 2,537,442 | 1/1951 | Carriker......................... | 152/330 C |
| 2,948,321 | 8/1960 | Mote............................... | 152/330 C |
| 3,101,110 | 8/1963 | Vandenberg.................... | 152/330 C |
| 3,515,195 | 6/1970 | Sperberg........................ | 152/330 C |

Primary Examiner—Drayton E. Hoffman
Attorney, Agent, or Firm—Steinberg & Blake

[57] ABSTRACT

A radiation tire according to the present invention has wires, nets or bands made of material having good thermal conductivity mounted in a cover, which wires, etc. are connected or can be connected with a plate exposed to the atmosphere made of material having equally good thermal conductivity.

3 Claims, 1 Drawing Figure

PATENTED FEB 11 1975 3,865,169
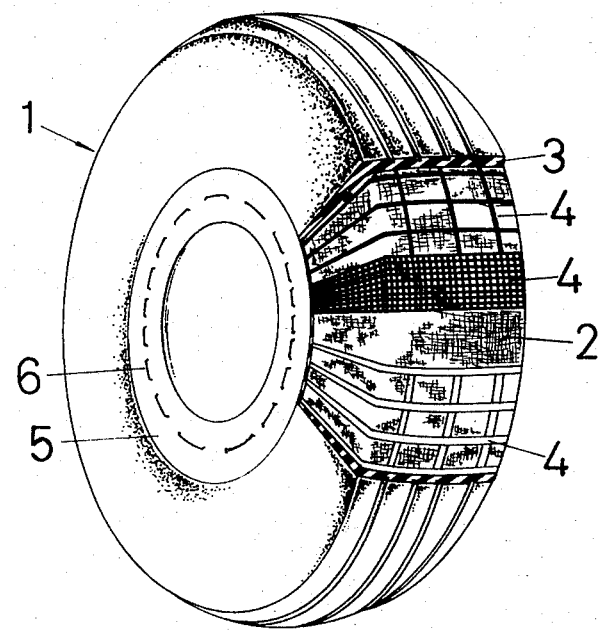

RADIATION TIRE

SUMMARY OF THE INVENTION

The present invention relates to a radiation tire. The principal object of the present invention is to forcibly dissipate heat generated within a tire by standing waves, etc., in order to prevent internal tire damage such as the separation of tread rubber from a carcass due to the above mentioned heat.

BRIEF DESCRIPTION OF THE DRAWING:

The attached drawing is a perspective view of a radiation tire according to the present invention, showing the internal construction thereof with part of the covering rubber layer removed.

DETAILED EXPLANATION OF THE INVENTION:

In general, a tire consists of rubber having very poor thermal conductivity (about $1.6 \times 10^{-3}$ w/cm deg.), fibre, etc. as principal components. Therefore, it is difficult to dissipate thermal energy generated in the tire such as heat due to standing waves into the atmosphere. For this reason, it is likely that thermal energy generated in a tire is accumulated therein. Owing to the above mentioned accumulated heat in the tire, tread rubber separates from carcass. When the tire runs at the high speed continously, a serious accident is often caused by such damage of the tire.

It is the main object of the present invention to dissipate thermal energy generated in the tire rapidly into the atmosphere from cooling fins exposed to the atmosphere, which are connected to a plate having good thermal conductivity which is in turn connected to highly thermo-conductive wires, nets or bands such as metal wires mounted in the tire.

The present invention will be explained in detail with reference to the attached drawing. The wires, nets or bands 4 (hereinafter called metal wires) made of material having high toughness and good thermal conductivity are mounted in the part where the internal fibre layer 2 of the tire 1 comes into contact with the outer rubber cover 3 of this location or in the neighborhood thereof. One end of the metal wires 4 is connected to the plate 5 made of material having equally good thermal conductivity (hereinafter called a rim) equipped with the cooling fins 6. The metal wires 4 are connected to the rim 5 for the purpose of conducting thermal energy from the metal wires 4 to the rim 5. For this purpose, the metal wires 4 may be brought into contact with the rim 5.

When a vehicle such as an automobile or an aircraft, etc. (hereinafter called an automobile) equipped with the tire 1 according to the present invention runs at the high speed for a long time, or a brake is applied to the tire under the condition of great load, thermal energy is accumulated in the tire due to standing waves therein or friction with a road surface or other reasons (that is to say, when the internal temperature of the tire rises), said thermal energy is dissipated into the atmosphere from the cooling fins through the metal wires 4 and the rim 5 having good thermal conductivity.

When an automobile is running at the high speed, a great deal of thermal energy is generated in the tire. However, in this case, the cooling fins 6 of the tire is also rotating at the high speed through the air. Therefore, the contact between the cooling fins and the atomosphere enhances heat dissipation. Accordingly, when the temperature of the metal wires 4 rises due to the thermal energy generated in the tire, the temperature gradient through the metal wires 4, the rim 5 and the cooling fins 6 becomes very steep. Therefore, the thermal energy in the tire is conducted to the metal wires 4 and the cooling fins 6 effectively to be well dissipated into the atmosphere. For this reason, the rise of the internal temperature of the tire 1 is controlled.

In some parts of the tire excluding parts where temperature rises markedly, for example, the rim cushion part, etc. of the tire, the metal wires 4 may be covered with heat insulator material of heat resistance (for example, asbestos, glass fibre, etc.) to prevent the radiation of the thermal energy in the tire during the transmission of thermal energy from the metal wires 4 to the cooling fins 6, for the purpose of conducting the thermal energy as much as possible to the cooling fins in order to dissipate it effectively into the atmosphere.

I claim:

1. In a rotary wheel, an outer tire and an inner metallic rim surrounded and engaged by said tire, said tire having an outer rubber layer and an inner fiber layer engaging said outer layer, and said layers forming for said tire an outer circumferential wall and a pair of side walls extending, respectively, inwardly from opposed peripheral edges of said outer circumferential wall into engagement with said rim, and a single network of elongated thermally conductive members situated between said inner and outer layers of said outer tire wall, said network being made up of circumferentially extending thermally conductive members distributed between said side walls of said tire and transversely extending thermally conductive members intersecting and extending across said circumferentially extending members and distributed circumferentially along said circumferential wall, said transverse members each having extensions extending inwardly substantially radially along said side walls between said layers thereof into engagement with said rim so that heat generated in the tire will be carried away by said thermally conductive members and transmitted thereby to said rim to be dissipated by the latter to the outer atmosphere.

2. The combination of claim 1 and wherein said rim carries fins for enhancing the dissipation of heat to the outer atmosphere.

3. The combination of claim 1 and wherein said thermally conductive members are covered with a heat insulator material at regions adjacent said rim.

* * * * *